(12) United States Patent
Ngo et al.

(10) Patent No.: US 6,937,423 B1
(45) Date of Patent: Aug. 30, 2005

(54) REDUCING EFFECTS OF ROTATIONAL VIBRATION IN DISK DRIVE

(75) Inventors: Lan V. Ngo, Garden Grove, CA (US); Raffi Codilian, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 6 days.

(21) Appl. No.: 10/773,526

(22) Filed: Feb. 6, 2004

(51) Int. Cl.[7] .............................................. G11B 5/596
(52) U.S. Cl. ............................... 360/77.02; 360/77.03; 360/77.07
(58) Field of Search ................................ 360/75, 77.01, 360/77.02, 77.03, 77.04, 77.06, 77.07, 77.08, 360/78.01, 78.04, 78.09, 78.11

(56) References Cited

U.S. PATENT DOCUMENTS 5,299,075 A * 3/1994 Hanks ..................... 360/77.02
6,414,813 B2 * 7/2002 Cvancara ................. 360/77.02
2004/0042114 A1 * 3/2004 Kusumoto ............... 360/77.04

* cited by examiner

Primary Examiner—David Hudspeth
Assistant Examiner—Jason Olson
(74) Attorney, Agent, or Firm—Ramin Mobarhan, Esq.

(57) ABSTRACT

A method of reducing rotational vibration effects in a disk drive by sensing vibration in a sensor and generating corresponding sensor data; deriving a statistical sensor (SS) value based on the sensor data; deriving a statistical position error signal (SPES) value from servo sectors read by the head; comparing the SS value to a SS-threshold value; comparing SPES value to a SPES-threshold value; and generating a feed-forward command effort signal for reducing rotational vibration effects if the SS value exceeds the SS-threshold value and if SPES value exceeds the SPES-threshold value.

19 Claims, 12 Drawing Sheets

REDUCING EFFECTS OF ROTATIONAL VIBRATION IN DISK DRIVE

FIELD OF THE INVENTION

This invention relates to effects of vibration on a disk drive. More particularly, the present invention is directed to reduction of vibration effects on a disk drive.

BACKGROUND OF THE INVENTION

Disk drives are commonly used to store large amounts of data in a readily available form. Typically, the primary components of a disk drive are a head disk assembly and a printed circuit board assembly which, when fixed to one another, form a functional unit that is then connected to a computer. The head disk assembly includes a head, and at least one data storage disk mounted on a spindle motor for rotating the storage disk near the head so that read/write operations may be performed on the disk.

A widely used measure of performance of a disk drive is the number of I/O operations performed by the disk drive. As such, it is essential that factors that adversely interfere with such operations be removed or reduced to within acceptable limits. One such adverse factor is rotational vibration. Rotational vibration can be induced due to a number of factors, such as when other disk drives in the same chassis spin or perform seek operations, or external forces on the rack or chassis containing the drive.

When rotational vibration exceeds acceptable limits of a drive's tolerance, the head may be shaken off-track during the read/write operations, causing delays in the scheduled operations of the drive and resulting in overall performance degradations. As track densities and spindle motor velocities increase to keep pace with growing demands for faster and larger capacity disk drives, so does the sensitivity of the disk drives to rotational vibration.

Accordingly, what is needed is a method for reducing the effects of rotational vibration in a disk drive.

SUMMARY OF THE INVENTION

This invention can be regarded as a method of reducing the effects of rotational vibration in a disk drive comprising a base, a cover, a disk being formatted with embedded servo sectors, a rotary actuator, a head affixed to the rotary actuator for reading the servo sectors, first and second sensors mounted for detecting acceleration of the disk drive, and a sampled servo control system for processing the detected acceleration and the servo sectors read by the head, to control motion of the rotary actuator. The method comprises sensing vibration by the first and second sensors and generating a corresponding first and second sensor data; deriving a statistical sensor (SS) value based on the first and second sensor data; and deriving a statistical position error signal (SPES) value from the servo sectors read by the head. The method further comprises comparing the SS value to a SS-threshold value; comparing the SPES value to a SPES-threshold value; and generating a feed-forward command effort signal for reducing the effects of rotational vibration if the SS value exceeds the SS-threshold value and if the SPES value exceeds the SPES-threshold value.

In an aspect of the invention, deriving the SS value comprises receiving a series of the generated first and second sensor data during a pre-selected interval based on a servo sampling rate, and generating a differential sensor value for each of the received first and second sensor data in the series. In another aspect of the invention, deriving the SS value further comprises determining an absolute value of the differential sensor values and calculating an average value of the determined absolute values.

In another aspect of the invention, the first and second sensors have a sensitivity axis which is oriented at a pre-selected angle relative to an orthogonal axis of the disk drive. In one embodiment, the pre-selected angle is 45 degrees.

This invention can also be regarded as a method of reducing the effects of rotational vibration in a disk drive comprising a base, a cover, a disk being formatted with embedded servo sectors, a rotary actuator, a head affixed to the rotary actuator for reading the servo sectors, a sensor mounted for detecting acceleration of the disk drive, and a sampled servo control system for processing the detected acceleration and the servo sectors read by the head to control motion of the rotary actuator, a method for reducing the effects of rotational vibration in the disk drive. The method comprises sensing vibration by the sensor and generating a corresponding sensor data; deriving a statistical sensor (SS) value based on the sensor data; and deriving a statistical position error signal (SPES) value from the servo sectors read by the head. The method further comprises comparing the SS value to a SS-threshold value; comparing the SPES value to a SPES-threshold value; and generating a feed-forward command effort signal for reducing the effects of rotational vibration if the SS value exceeds the SS-threshold value and if the SPES value exceeds the SPES-threshold value.

DETAILED DESCRIPTION OF THE INVENTION

Figure 1A:
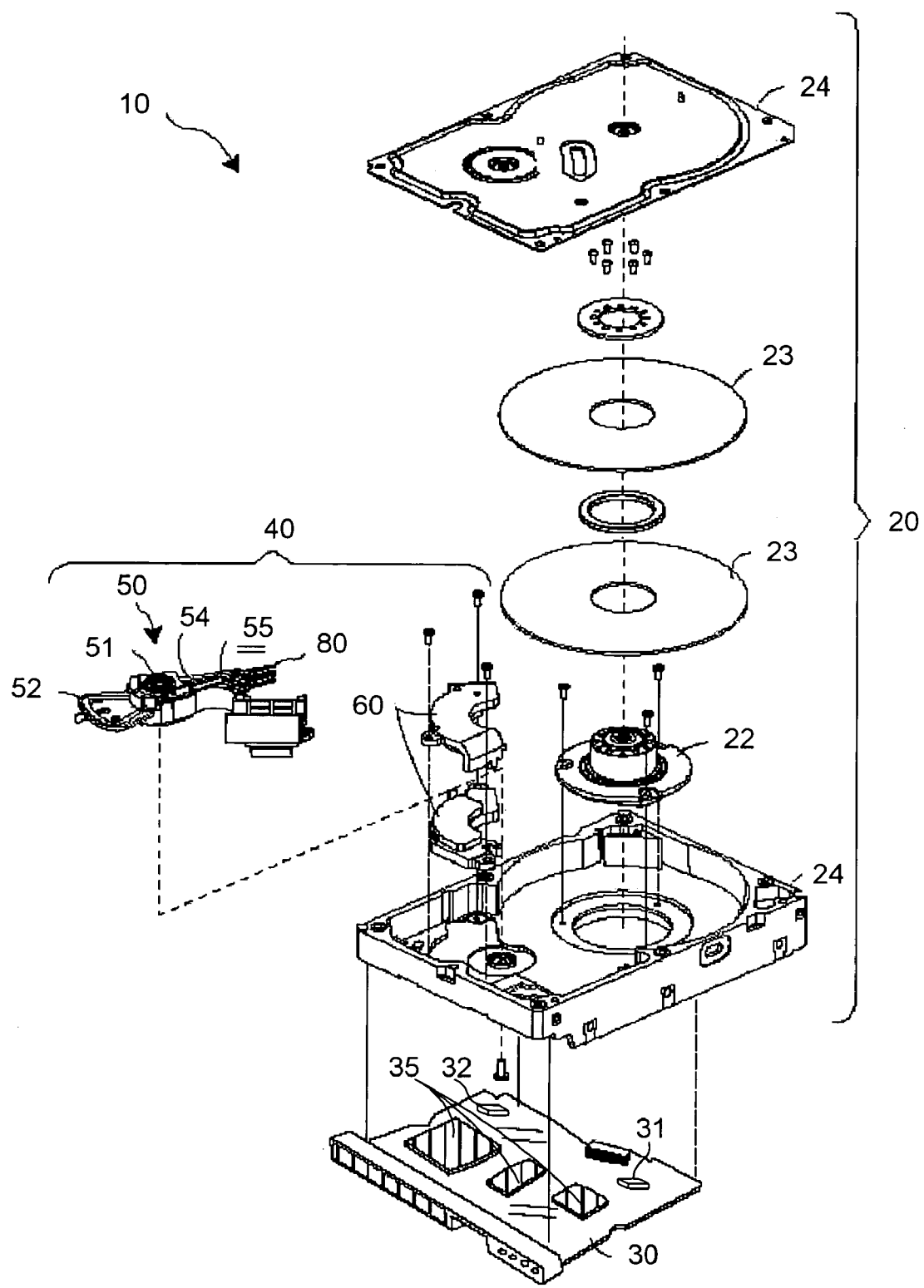
FIGS. 1A–C illustrate an exemplary hard disk drive in which the various embodiments of the present invention may be practiced.

With reference to FIG. 1A, an exemplary hard disk drive 10 in which the present invention may be practiced is shown. As shown, the disk drive 10 comprises a head disk assembly ("HDA") 20 including a base 21, one or more rotating disks 23 being formatted with embedded servo sectors (not shown), a rotary actuator 50 that pivots relative to the base 21, a head 80 affixed to the rotary actuator 50 for reading the servo sectors. The rotary actuator 50 rotates about a pivot axis extending through a center of a pivot cartridge 51 that secures the actuator 50 to the base 21, adjacent to disks 23. An actuator arm 54 extends to one side in order to carry the head 80 over a disk 23 for reading and writing data and a voice coil 52 extends from the other side for interacting with a pair of permanent magnets 60. The voice coil 52 and magnets 60 are frequently regarded as a "voice coil motor", or VCM 40. Disks 23 are rotated by a spindle motor 22. A cover plate 24 encloses the foregoing components in a cavity within the base 21.

As also shown in FIG. 1A, the disk drive 10 includes sensors 31 and 32 for detecting acceleration of the disk drive 10. Suitably, sensors 31 and 32 are mounted on a Printed Circuit Board Assembly (PCBA) 30 rigidly mounted to an underside of the base 21. The PCBA 30 also suitably contains a servo control system 35 for sample processing the detected acceleration and the servo sectors read by the head 80, and to control motion of the rotary actuator 50. Suitably, each of the sensors 31 and 32 comprises a linear accelerometer.

Figure 1B:
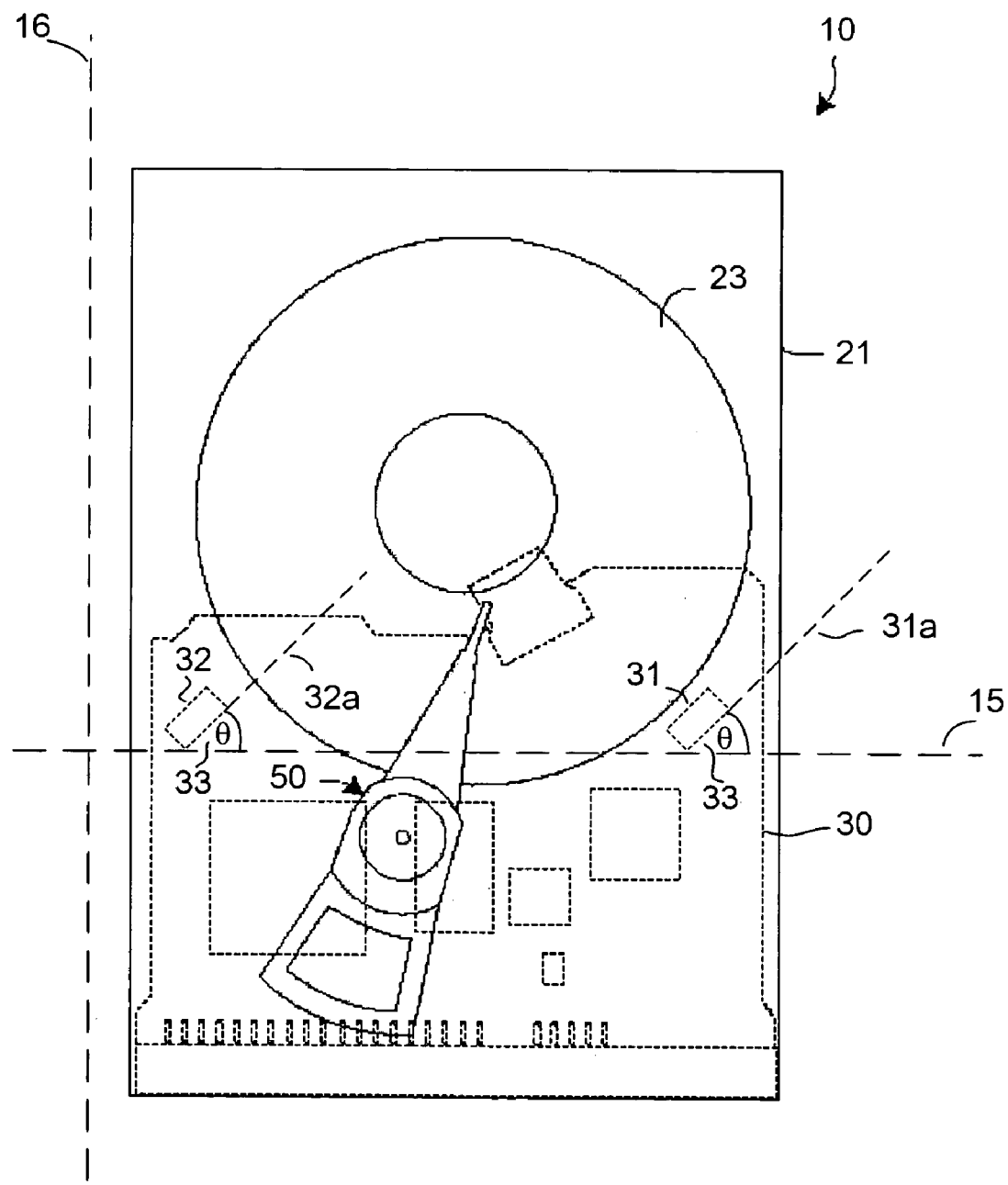

FIG. 1B is a simplified plan view of the disk drive 10 showing the PCBA 30 (in phantom) with sensors 31 and 32 mounted thereon. As shown, each of sensors 31 and 32 has a sensitivity axis represented by lines 31a and 32a, respectively. Suitably, sensors 31 and 32 are oriented on the disk drive 10 with their sensitivity axis 31a and 32a at a pre-selected angle relative to an orthogonal axis 15 or 16 of the disk drive 10, such as at a pre-selected angle θ 33 to axis 15, so that their sensitivity axes are parallel to each other. In an exemplary embodiment, orthogonal axes 15 and 16 respectively correspond to x-axis and y-axis in a Cartesian coordinate system. Suitably, the pre-selected angle θ 33 is 45 degrees.

Figure 1C:
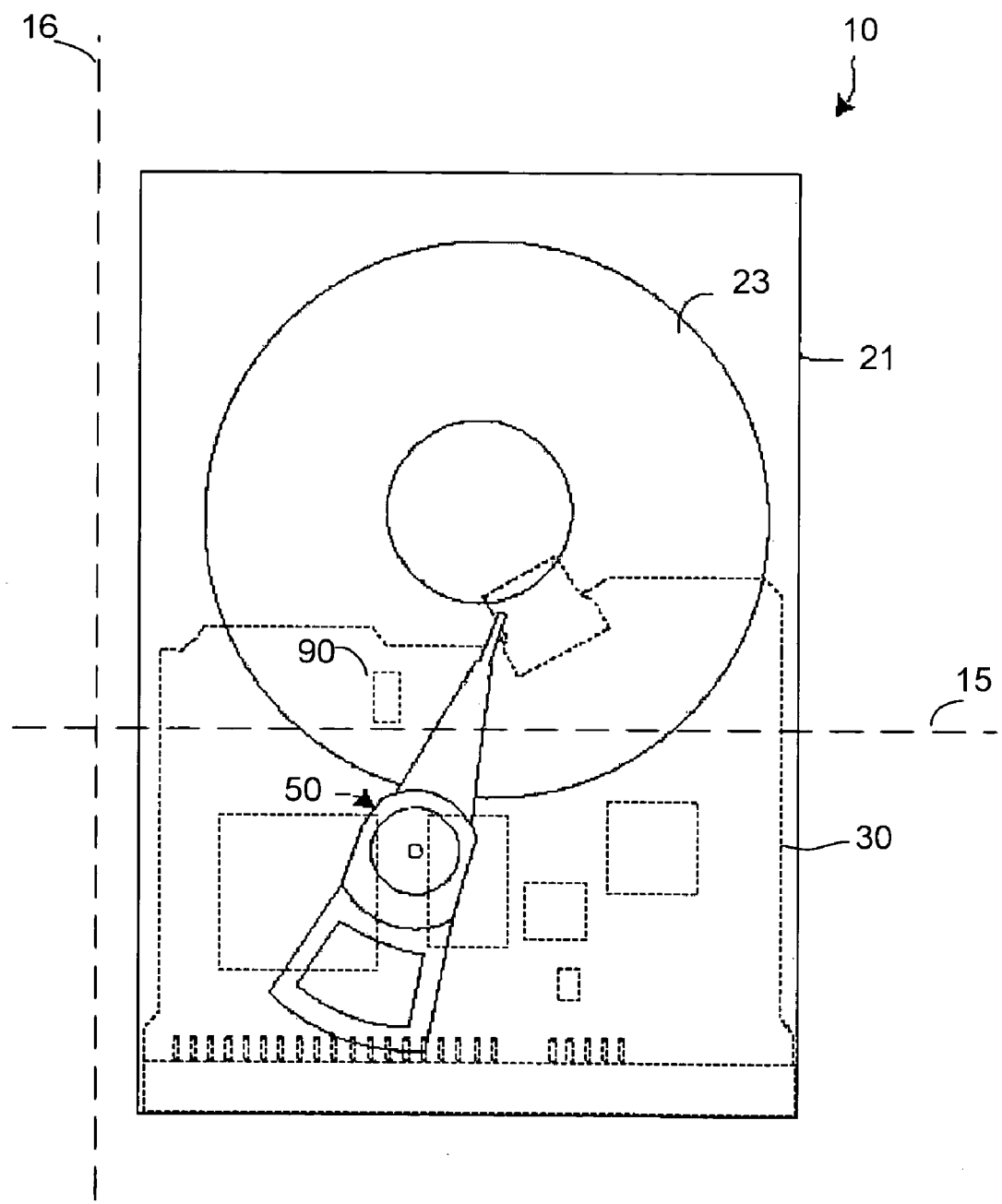
Figure 2A:
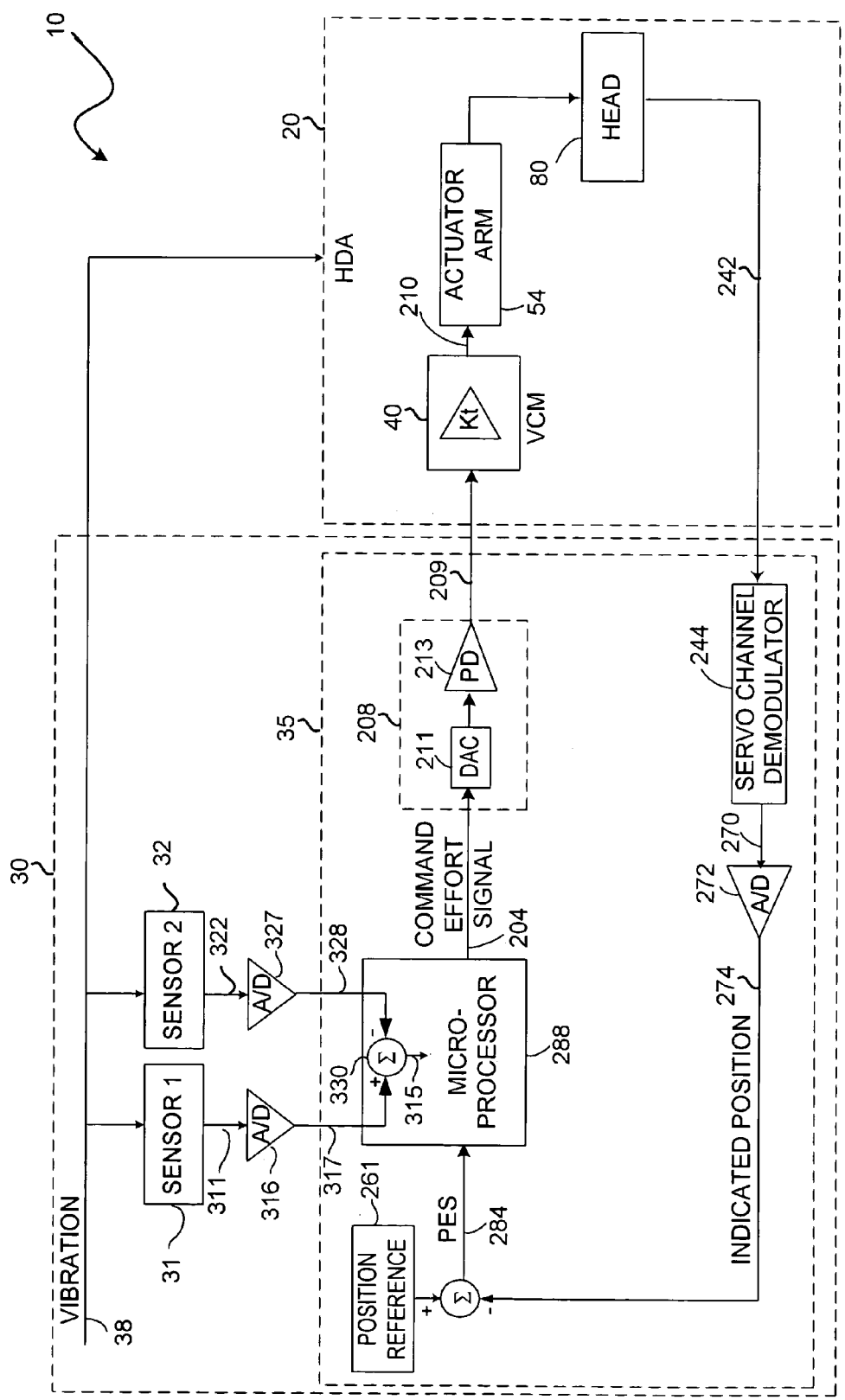
FIGS. 2A–C are block diagrams of a sampled servo control system disposed on PCBA an element of the exemplary hard disk drives shown in FIGS. 1A–C.
Figure 2B:
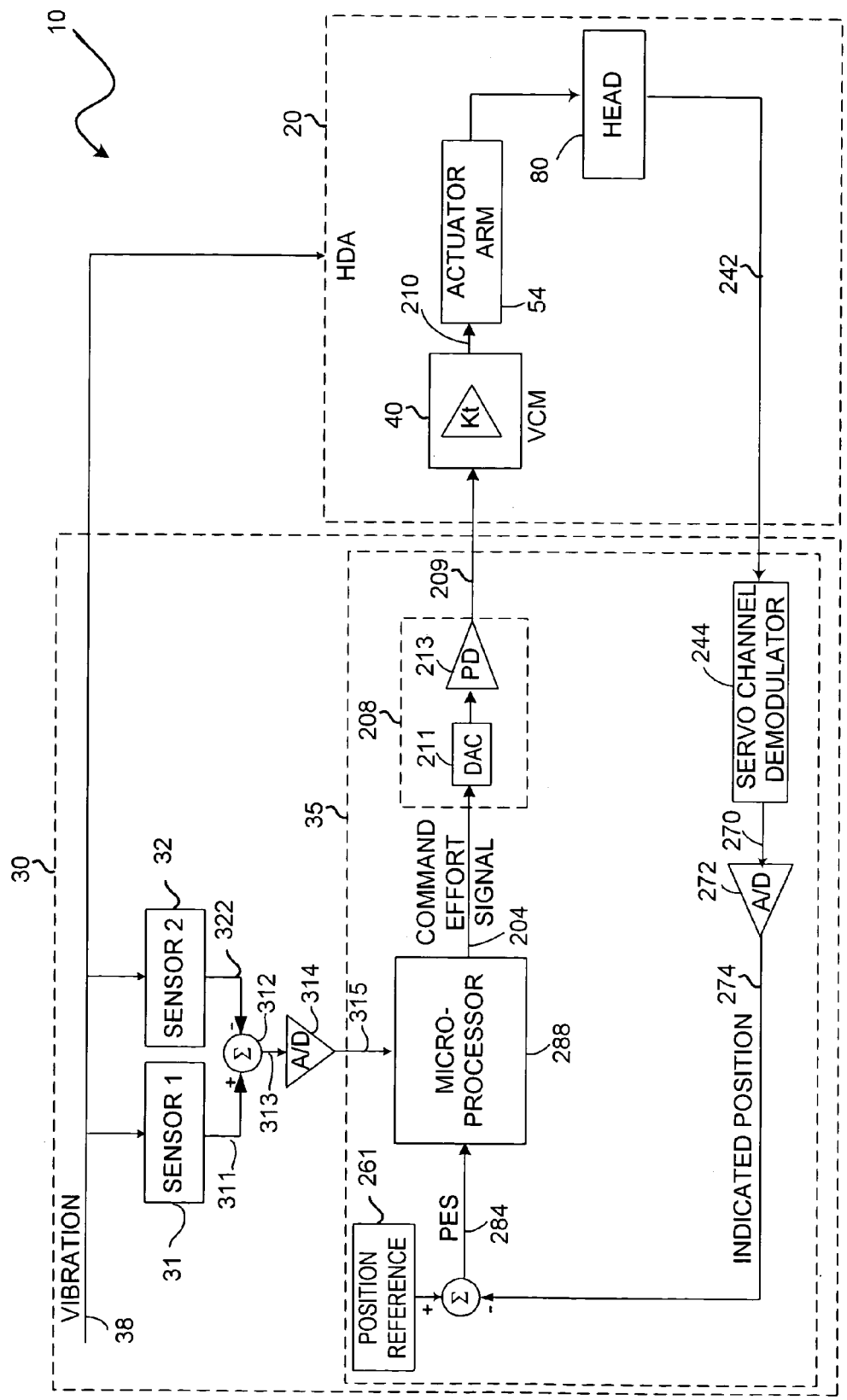
Figure 2C:
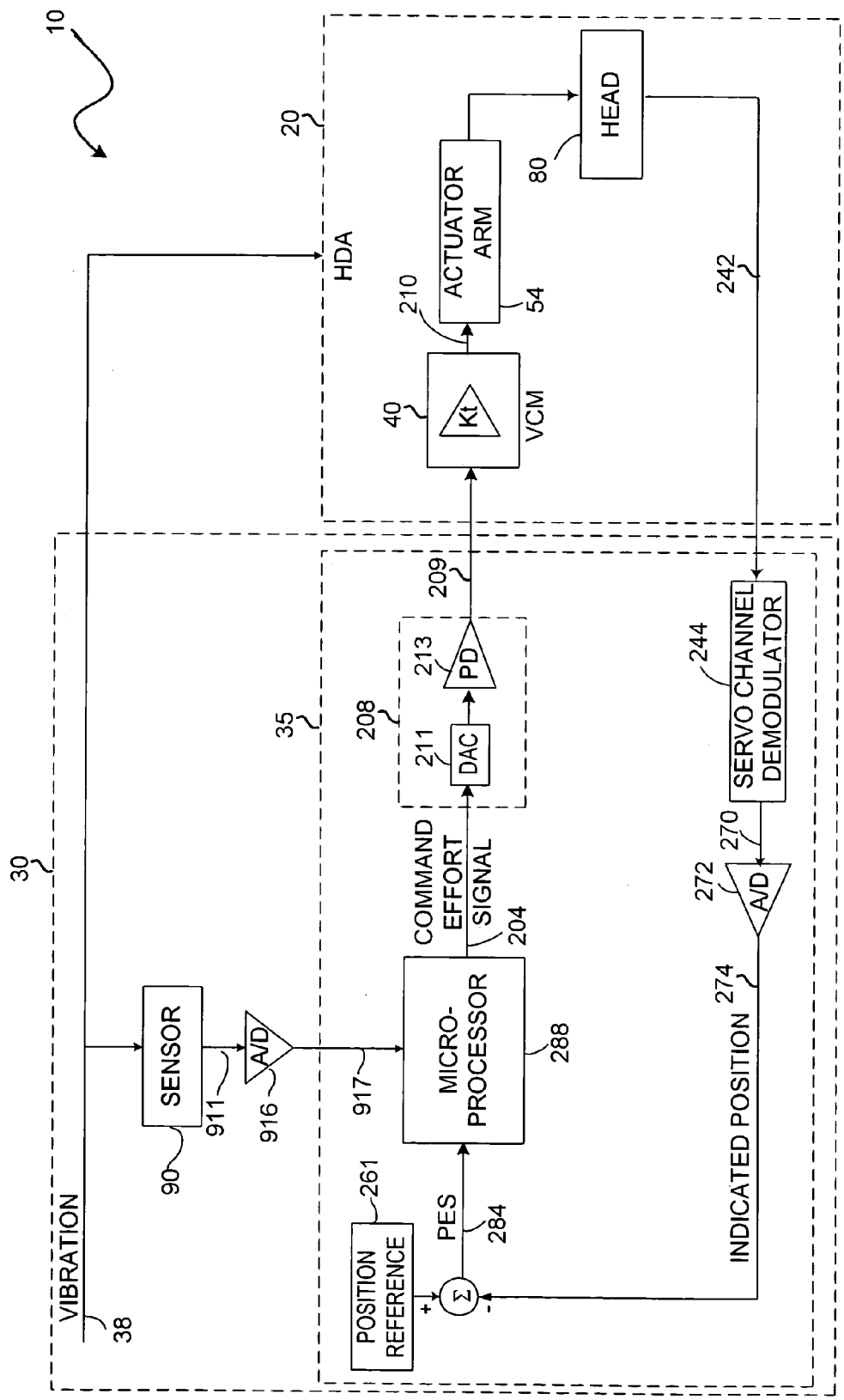

FIGS. 2A–C are block diagrams of a sampled servo control system in PCBA 30 of the exemplary hard disk drive 10 shown in FIGS. 1A–C. As shown in FIGS. 2A–C, VCM 40 of HDA 20 is characterized by a torque output parameter 210. The servo control system 35 comprises a motor driver circuit 208 for receiving a series of command effort signals 204 from microprocessor 288. Suitably, the motor driver circuit 208 comprises a digital to analog converter (DAC) 211 and a power driver (PD) 213, such as a power driver circuit. The motor driver circuit 208 provides an operating current 209 to VCM 40 based on the command effort signals 204 for causing the actuator arm 54 to carry the head 80 over a disk 23. Suitably, the location of the head 80, indicated by head location signal 242, is concurrently monitored by a servo channel demodulator 244 which outputs an analog signal 270 corresponding to the head location signal 242 that is typically converted to a digital signal 274 by an analog to digital converter (ADC) 272. The digital signal 274 corresponds to an indicated track position and off-track percentage value. The digital signal 274 is then combined with a signal corresponding to a position reference 261 to generate a position error signal (PES) 284 that is received by the microprocessor 288.

In the exemplary embodiments shown in FIGS. 2A–B, the microprocessor 288 also receives a digital differential sensor value 315 derived from sensor data 311 and 322, respectively. Sensor data 311 and 322 are generated by the sensors 31 and 32 in response to sensing of induced vibration disturbance 38 affecting the PCBA 30 and HDA 20, such as linear and rotational vibration. In the exemplary embodiment shown in FIG. 2A, analog sensor data 311 and 322 are digitized by ADCs 316 and 327 respectively, and outputted as digitized sensor data 317 and 328, respectively. The digitized sensor data 317 and 328 are then received in a digital differential generator 330, suitably as part of the microprocessor 288, which generates a digital differential sensor value 315. In the exemplary embodiment shown in FIG. 2B, analog sensor data 311 and 322 are received in an analog differential generator 312 which outputs an analog differential sensor value 313 which is subsequently converted into the digital differential sensor value 315 by ADC 314 and inputted into the microprocessor 288.

Figure 3A:
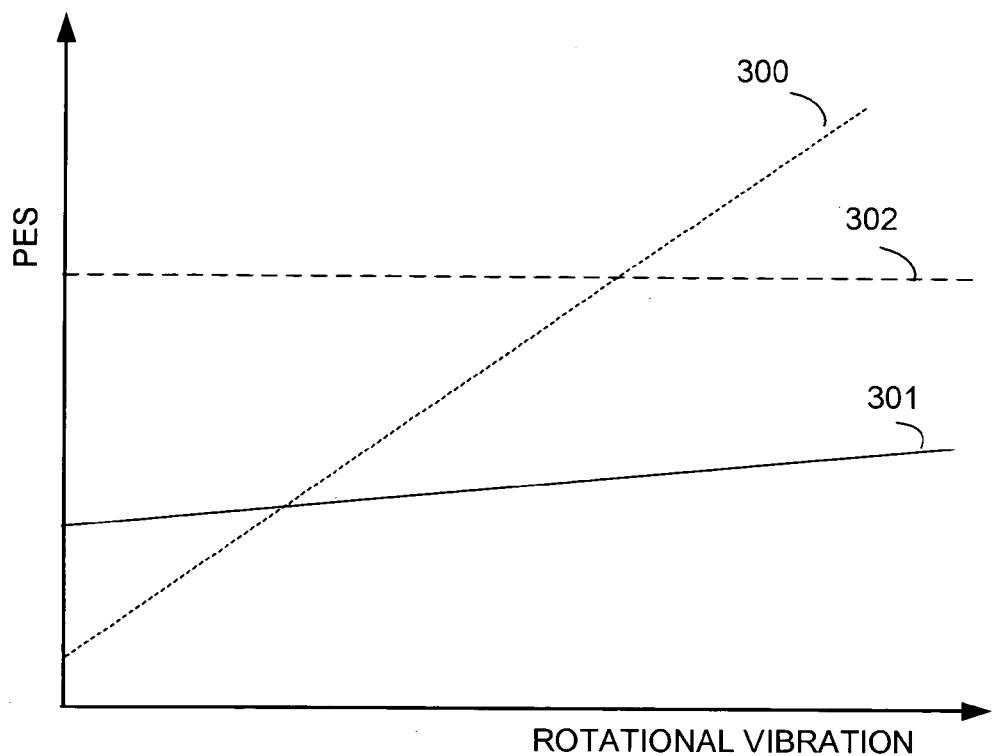
FIGS. 3A–B are diagrams respectively illustrating the effect of using the invention to reduce position error signal (PES) in the disk drive.

As shown in FIG. 3A via line 300, increases in magnitude of vibration 38 increase the off-track position of the head 80 and corresponding PES 284, resulting in performance degradation, even preventing the head 80 from performing valid read/write operations if a maximum predetermined tolerance level (line 302) is exceeded. As such, well known vibration-reducing algorithms have been implemented in prior art devices to attenuate the effects of vibration, particularly rotational vibration which are generally characterized by higher magnitude, on the disk drive 10. The microprocessor 288 applies these vibration-reducing algorithms to PES 284 and digital differential sensor value 315 and generates a feed-forward command effort signal 204 for reducing the effects of rotational vibration 38 on the HDA 20. As shown in FIG. 3A via line 301, the use of vibration-reducing algorithms attenuates the rate of increase of PES 284 versus vibration 38 so that PES 284 will remain within acceptable limits (i.e. below line 302) for the head 80 to perform read/write operations.

While vibration-reducing algorithms provide an effective approach to attenuate the increase of PES 284 in response to increases in vibration 35, their use is not without shortcomings. Currently, vibration-reducing algorithms are implemented such that they remain activated throughout the operation of the disk drive 10, even when the vibration 38 and PES 284 are well within acceptable limits, such as when the disk drive 10 is experiencing negligible rotational vibration or linear vibration which appears as rotational vibration due to a mismatch in the gain of sensors 31 and 32. As shown in FIG. 3A, when the sensed vibration 35 is low, as generally represented by the area to the left of the intersection of lines 300 and 301, the use of vibration-reducing algorithms detrimentally increases the PES 284 while also consuming microprocessor 288 and other system resources, resulting in overall performance degradations of disk drive 10.

Figure 4:
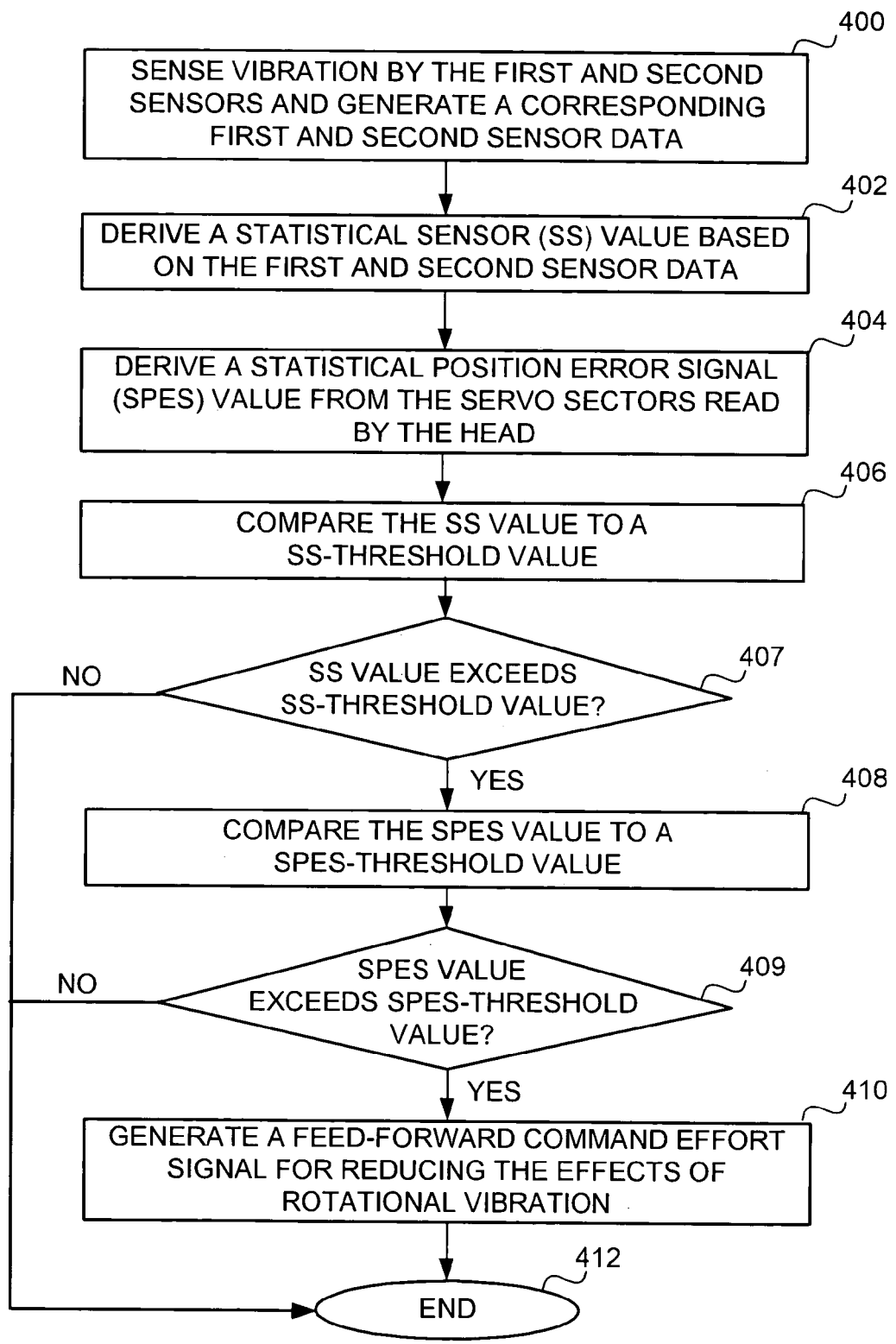
FIG. 4 is a flow chart illustrating a process used in an embodiment of the invention shown in FIGS. 2A–B.

FIG. 4, in conjunction with FIGS. 2A–B, illustrates a process of the present invention for reducing the effects of rotational vibration in a disk drive 10. The process begins at block 400 where a vibration 35 is sensed by sensors 31, 32 and a corresponding sensor data 311, 322 are generated and received in microprocessor 288. Next, in block 402, a statistical sensor (SS) value is derived by the microprocessor 288 based on sensor data 311 and 322, as described below and in greater detail in conjunction with FIGS. 5A–B. Next, in block 404, the microprocessor 288 derives a statistical position error signal (SPES) value from the servo sectors read by the head 80 as described below and in greater detail in conjunction with FIGS. 6A–B.

Next, in block 406, the derived SS value is compared to a SS-threshold value. Suitably, the SS-threshold value, as shown by T1 line 305 in FIG. 3B, corresponds to a lower limit of vibration magnitude which if exceeded is sufficient to enable a feed forward command effort signal 204 conditioned on a positive outcome of the below-described decision block 409. Next, in decision block 407, if based on the comparison in block 406 it is determined that the SS value does not exceed the SS-threshold value the flow then proceeds directly to block 412 where the overall process ends. If the SS value exceeds the SS-threshold value, then the flow proceeds to block 408 where the derived SPES value is compared to a SPES-threshold value. Suitably, the SPES-threshold value, as shown by T2 line 304 in FIG. 3B, corresponds to a lower limit on the degree of off-track position of the head 80 which if exceeded is sufficient to enable a feed forward command effort signal 204 at this stage of the process. Suitably, the SS-threshold and the SPES-threshold values are each obtained from a characterization testing of a plurality of disk drives 10. Next, in decision block 409, if based on the comparison in block 408 it is determined that the SPES value does not exceed the SPES-threshold value the flow then proceeds directly to block 412 where the overall process ends. If the SPES value exceeds the SPES-threshold value, then the flow proceeds to block 410 wherein the microprocessor 288, based on the positive determinations of block 407 and 409, then generates a feed-forward command effort signal 204 for reducing the effects of rotational vibration in disk drive 10. The flow then proceeds to block 412 where the overall process ends.

Figure 3B:
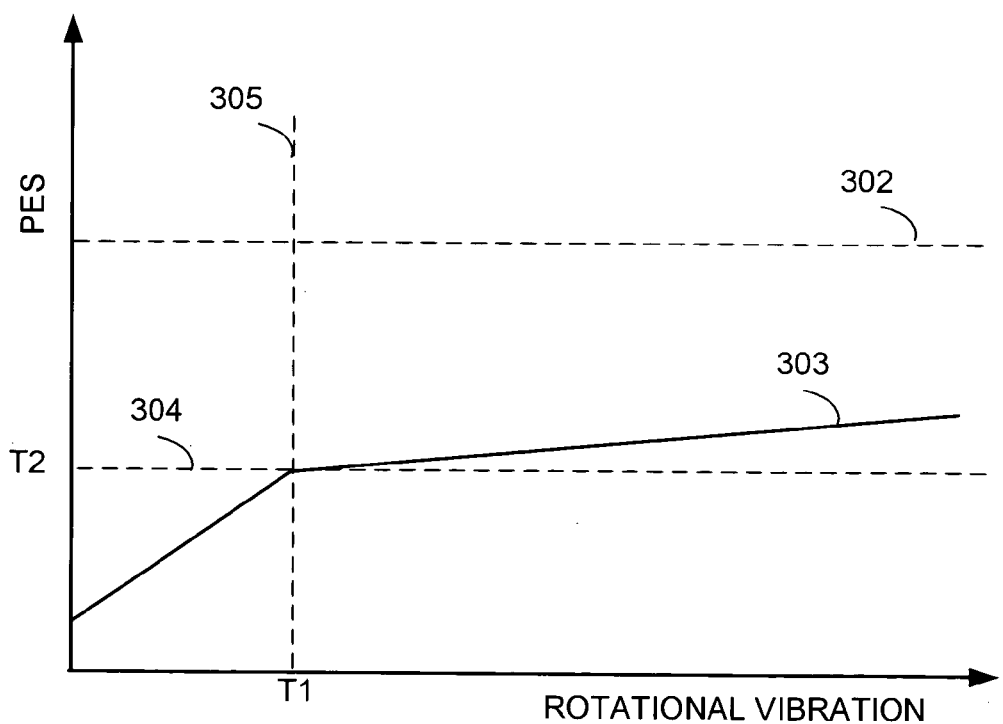

As shown in FIG. 3B via line 303, using the foregoing method results in the vibration algorithms to remain inactive until both T1 and T2 thresholds are exceeded. In this way, the line 303 follows a PES 284 pattern similar to that of line 300 of FIG. 3A and therefore remains lower than if the vibration algorithms were active. Once both T1 and T2 thresholds are exceeded, the vibration-reducing algorithms are activated to reduce the rate of increase of PES 284 versus vibration 38. Thus line 303 thereafter follows a pattern similar to that of line 301 of FIG. 3A so that PES 284 will remain within acceptable limits for the head 80 to perform read/write operations (i.e. below line 302).

One advantage of the foregoing feature of the present invention over the prior art is that by activating the vibration-reducing algorithms only when both PES and vibration thresholds have been exceeded, the present invention reduces an unnecessary increase in PES 284 for low vibration levels and otherwise allocation of microprocessor 288 and system resources as the result of using vibration-reducing algorithms.

Figure 5A:
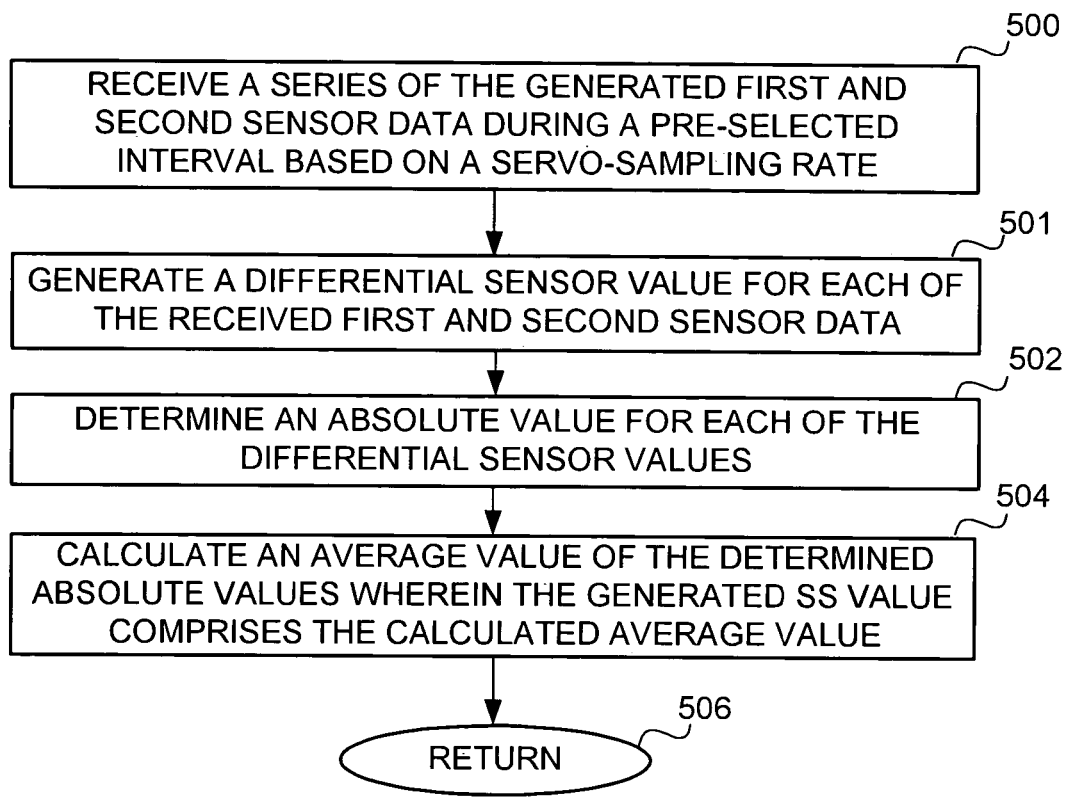
FIGS. 5A–B are flow charts illustrating processes used in conjunction with the process shown in FIG. 4.
Figure 5B:
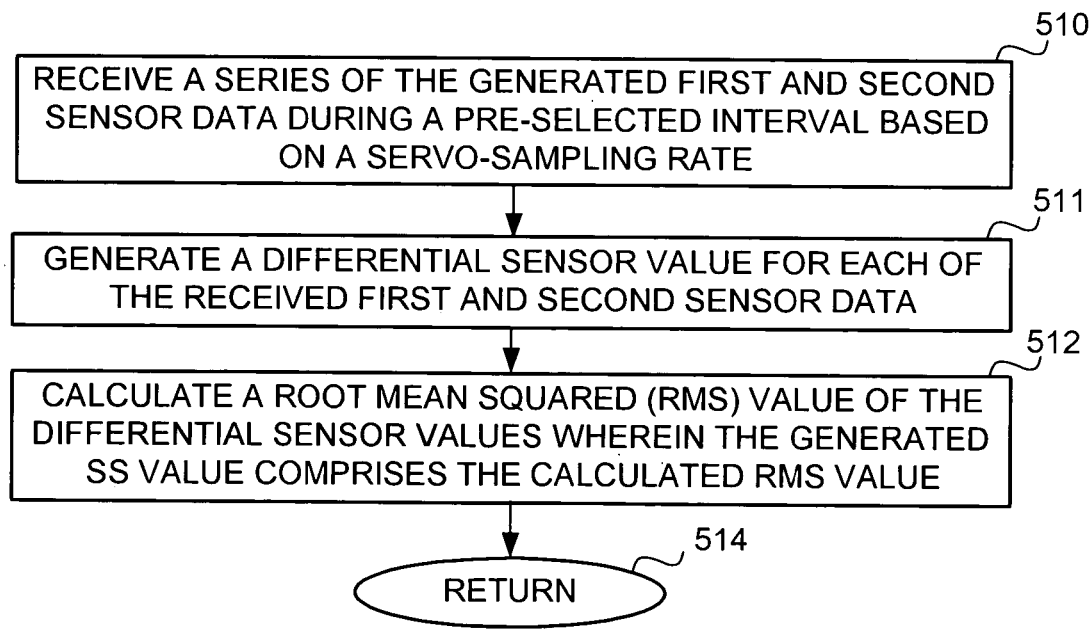

FIGS. 5A–B are flow charts describing in greater detail exemplary processes that can be used in block 402 of FIG. 4 for deriving a statistical sensor (SS) value based on sensor data 311 and 322. In the exemplary process shown in FIG. 5A, the process begins at block 500 where a series of the generated sensor data, such as analog sensor data 311 and 322 or digitized sensor data 317 and 328 are received, such as in analog differential generator 312 or digital differential generator 330, during a pre-selected interval based on a servo-sampling rate, such as every (or a multiple increment of) 128 servo-samples. Next, in block 501, a differential sensor value 315 is generated for each of the received sensor data (in the manner described above in conjunction with FIGS. 2A–B), to be used by microprocessor 288. Next, in block 502, an absolute value for each of the received sensor data 311 and 322 is determined by the microprocessor 288. Next, in block 504, an average value of the determined absolute values are calculated wherein the generated SS value comprises the calculated average value. The flow then proceeds to block 506 for returning to block 402 of FIG. 4.

In the exemplary process shown in FIG. 5B, the process begins at block 510 where a series of the generated sensor data, such as analog sensor data 311 and 322 or digitized sensor data 317 and 328 are received, such as in analog differential generator 312 or digital differential generator 330, during a pre-selected interval based on a servo-sampling rate, such as every 128 servo-samples. Next, in block 511, a differential sensor value 315 is generated for each of the received sensor data (in the manner described above in conjunction with FIGS. 2A–B), to be used by microprocessor 288. Next, in block 512 a root mean square (RMS) value of the sensor data 311 and 322 are calculated wherein the generated SS value comprises the calculated RMS value. The flow then proceeds to block 514 for returning to block 402 of FIG. 4. It should be noted that the processes described in FIGS. 5A–B are exemplary only and the present invention is not limited to the foregoing exemplary processes.

Figure 6A:
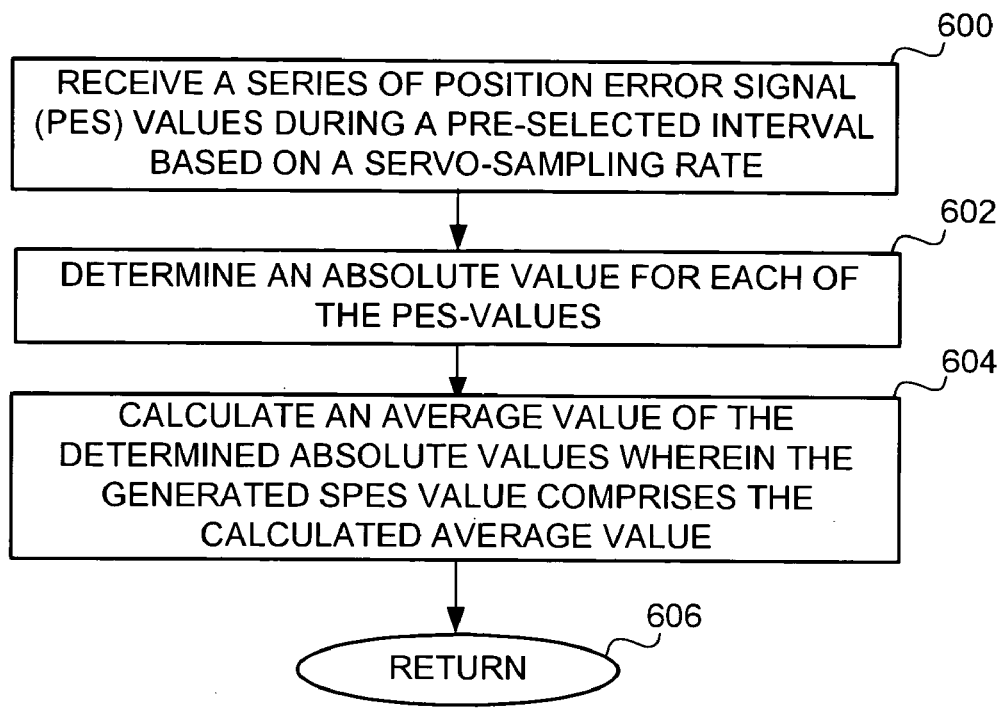
FIGS. 6A–B are flow charts illustrating further processes used in conjunction with the process shown in FIG. 4.
Figure 6B:
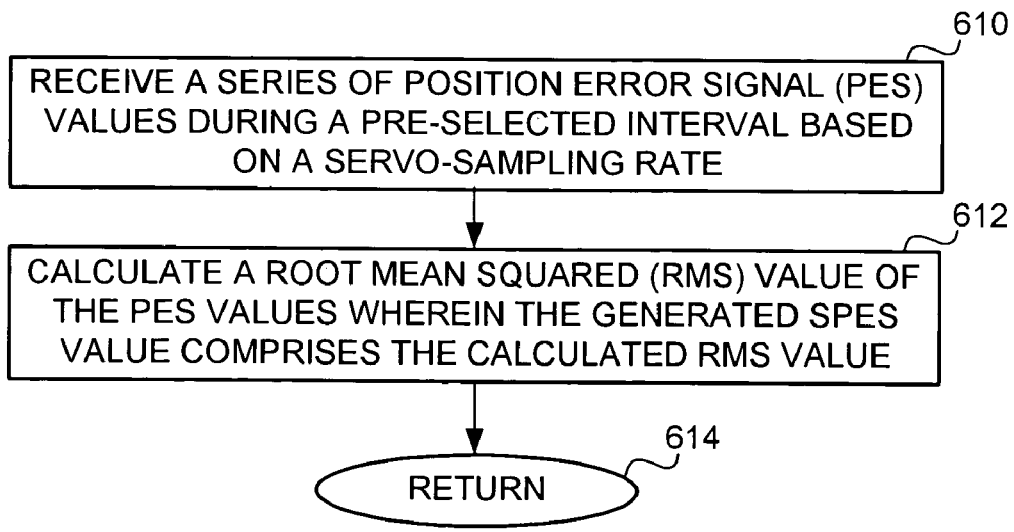

FIGS. 6A–B are flow charts describing in greater detail exemplary processes that can be used in block 404 of FIG. 4 for deriving a statistical position error signal (SPES) value from the servo sectors read by the head 80. In the exemplary process shown in FIG. 6A, the process begins at block 600 where a series of position error signal (PES) values corresponding to PES 284 are received in the microprocessor 288 during a pre-selected interval based on a servo-sampling rate, such as every (or a multiple increment of) 128 servo-samples. Next, in block 602, an absolute value for each of the PES-values is determined. Next, in block 604, an average value of the determined absolute values are calculated wherein the generated SPES value comprises the calculated average value. The flow then proceeds to block 606 for returning to block 404 of FIG. 4.

In the exemplary process shown in FIG. 6B, the process begins at block 610 where a series of position error signal (PES) values corresponding to PES 284 are received in the microprocessor 288 during a pre-selected interval based on a servo-sampling rate, such as every (or a multiple increment of) 128 servo-samples. Next, in block 612 a root mean square (RMS) value of the PES values are calculated wherein the generated SPES comprises the calculated RMS value. The flow then proceeds to block 614 for returning to block 402 of FIG. 4. It should be noted that the processes described in FIGS. 6A–B are exemplary only and the present invention is not limited to the foregoing exemplary processes.

With reference to FIG. 1C, a simplified plan view of another embodiment of the present invention is shown in which a sensor 90 is mounted on the PCBA 30 (shown in phantom. Suitably, sensor 90 comprises a rotary accelerometer.

FIG. 2C is a block diagram of the embodiment of the present invention shown in FIG. 1C, in which the microprocessor 288 receives a digital sensor value 917 derived from sensor data 911. Sensor data 911 is generated by the sensors 90 in response to sensing of induced vibration disturbance 38 affecting the PCBA 30 and HDA 20, such rotational vibration. In the exemplary embodiment shown in FIG. 2C, analog sensor data 911 is digitized by ADC 916 and outputted as digitized sensor data 917 to microprocessor 288.

Figure 7:
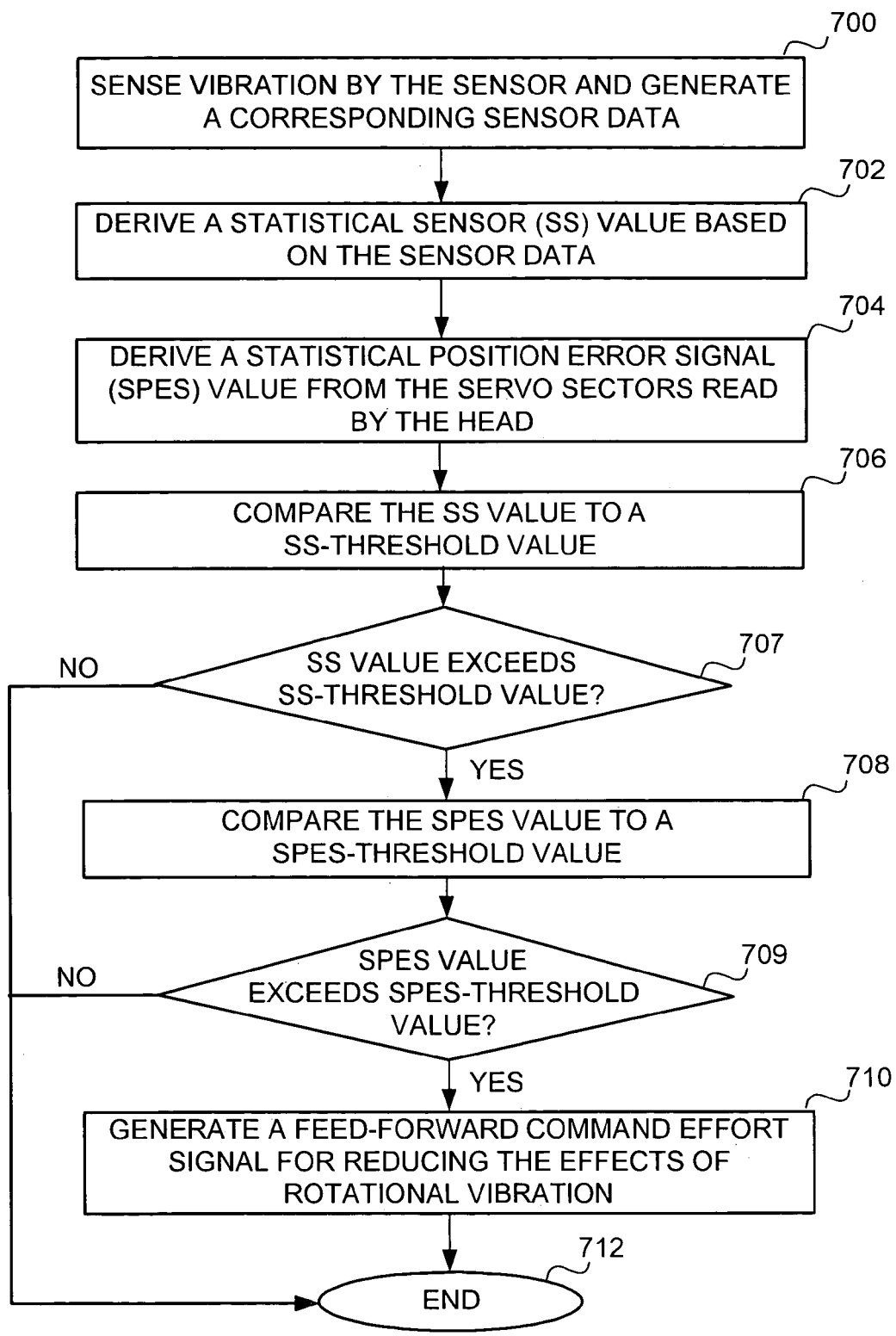
FIG. 7 is a flow chart illustrating a process used in another embodiment of the invention shown in FIG. 2C.

FIG. 7, in conjunction with FIG. 2C, illustrates a process of the present invention for reducing the effects of rotational vibration in a disk drive 10. The process begins at block 700 where a vibration 35 is sensed by sensor 90 and a corresponding sensor data 911 is generated and received in microprocessor 288. Next, in block 702, a statistical sensor (SS) value is derived by the microprocessor 288 based on sensor data 911 as described below and in greater detail in conjunction with FIGS. 8A–B. Next, in block 704, the microprocessor 288 derives a statistical position error signal (SPES) value from the servo sectors read by the head 80 in the manner described above in conjunction with FIGS. 6A–B.

Next, in block 706, the derived SS value is compared to a SS-threshold value. Suitably, the SS-threshold value, as shown by T1 line 305 in FIG. 3B, corresponds to a lower limit of vibration magnitude which if exceeded is sufficient to enable a feed forward command effort signal 204 conditioned on a positive outcome of the below-described decision block 709. Next, in decision block 707, if based on the comparison in block 706 it is determined that the SS value does not exceed the SS-threshold value the flow then proceeds directly to block 712 where the overall process ends. If the SS value exceeds the SS-threshold value, then the flow proceeds to block 708 where the derived SPES value is compared to a SPES-threshold value. Suitably, the SPES-threshold value, as shown by T2 line 304 in FIG. 3B, corresponds to a lower limit on the degree of off-track position of the head 80 which if exceeded is sufficient to enable a feed forward command effort signal 204 at this stage of the process. Suitably, the SS-threshold and the SPES-threshold values are each obtained from a characterization testing of a plurality of disk drives 10. Next, in decision block 709, if based on the comparison in block 708 it is determined that the SPES value does not exceed the SPES-threshold value the flow then proceeds directly to block 712 where the overall process ends. If the SPES value exceeds the SPES-threshold value, then the flow proceeds to block 710 wherein microprocessor 288, based on the positive determinations of block 707 and 709, then generates a feed-forward command effort signal 204 for reducing the effects of rotational vibration in disk drive 10. The flow then proceeds to block 712 where the overall process ends.

As shown in FIG. 3B via line 303, using the foregoing method results in the vibration algorithms to remain inactive until both T1 and T2 thresholds are exceeded. In this way, the line 303 follows a PES 284 pattern similar to that of line 300 of FIG. 3A and therefore remains lower than if the vibration algorithms were active. Once both T1 and T2 thresholds are exceeded, the vibration-reducing algorithms are activated to reduce the rate of increase of PES 284 versus vibration 38. Thus line 303 thereafter follows a pattern similar to that of line 301 of FIG. 3A so that PES 284 will remain within acceptable limits for the head 80 to perform read/write operations (i.e. below line 302).

One advantage of the foregoing feature of the present invention over the prior art is that by activating the vibration-reducing algorithms only when both PES and vibration thresholds have been exceeded, the present invention reduces an unnecessary increase in PES 284 for low vibration levels and otherwise allocation of microprocessor 288 and system resources as the result of using vibration-reducing algorithms.

Figure 8A:
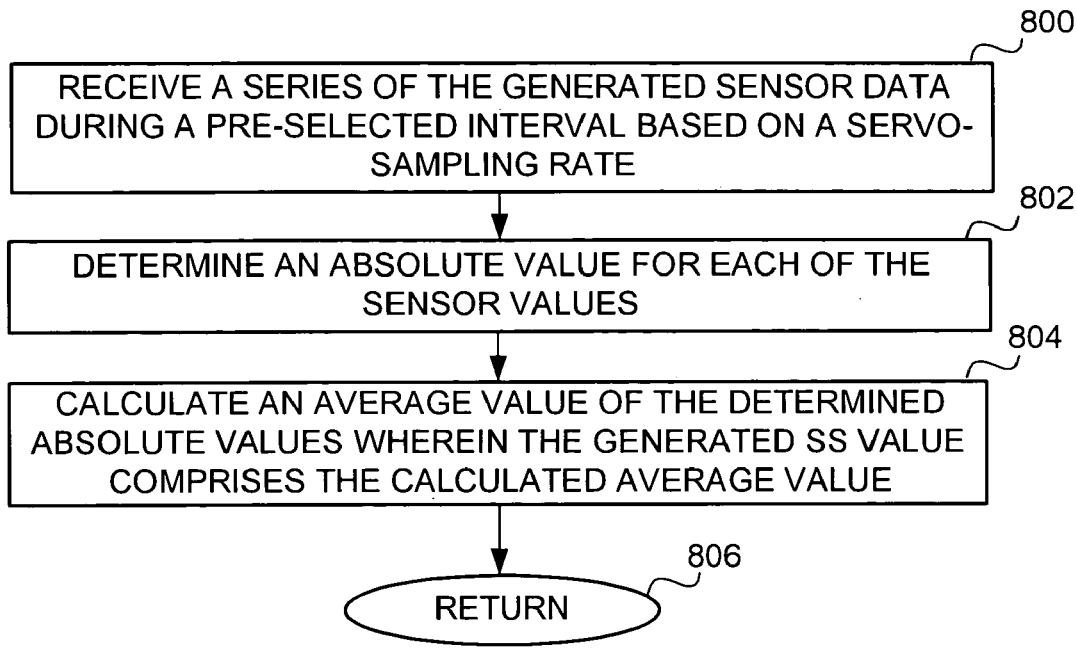
FIGS. 8A–B are flow charts illustrating processes used in conjunction with the process shown in FIG. 7.
Figure 8B:
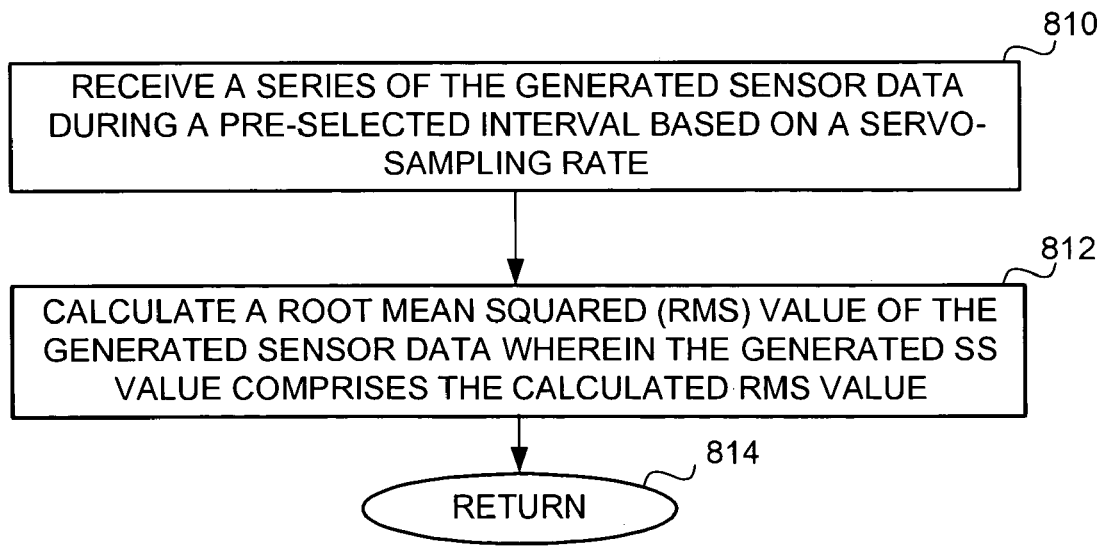

FIGS. 8A–B are flow charts describing in greater detail exemplary processes used in block 702 of FIG. 7 for deriving a statistical sensor (SS) value based on sensor data 911. In the exemplary process shown in FIG. 8A, the process begins at block 800 where a series of the generated sensor data, such as digitized sensor data 917 are received in the microprocessor 288 during a pre-selected interval based on a servo-sampling rate, such as every (or a multiple increment on 128 servo-samples. Next, in block 802, an absolute value for each of the received digitized sensor data 917 is determined by the microprocessor 288. Next, in block 804, an average value of the determined absolute values are calculated wherein the generated SS value comprises the calculated average value. The flow then proceeds to block 806 for returning to block 702 of FIG. 7.

In the exemplary process shown in FIG. 8B, the process begins at block 810 where a series of the generated sensor data, such as digitized sensor data 917 are received in the microprocessor 288 during a pre-selected interval based on a servo-sampling rate, such as every (or a multiple increment of) 128 servo-samples. Next, in block 812 a root mean square (RMS) value of the digitized sensor data 917 are calculated wherein the generated SS value comprises the calculated RMS value. The flow then proceeds to block 814 for returning to block 702 of FIG. 7. It should be noted that the processes described in FIGS. 8A–B are exemplary only and the present invention is not limited to the foregoing exemplary processes.

It should be noted that the various features of the foregoing embodiments were discussed separately for clarity of description only and they can be incorporated in whole or in part into a single embodiment of the invention having all or some of these features.

What is claimed is:

1. In a disk drive comprising a base, a cover, a disk being formatted with embedded servo sectors, a rotary actuator, a head affixed to the rotary actuator for reading the servo sectors, a sensor mounted for detecting acceleration of the disk drive, and a sampled servo control system for processing the detected acceleration and the servo sectors read by the head to control motion of the rotary actuator, a method for reducing the effects of rotational vibration in the disk drive, the method comprising:

sensing vibration by the sensor and generating a corresponding sensor data;

deriving a statistical sensor (SS) value based on the sensor data;

deriving a statistical position error signal (SPES) value from the servo sectors read by the head;

comparing the SS value to a SS-threshold value;

comparing the SPES value to a SPES-threshold value; and generating a feed-forward command effort signal for reducing the effects of rotational vibration if the SS value exceeds the SS-threshold value and if the SPES value exceeds the SPES-threshold value.

2. The method of claim 1, wherein deriving the SPES value comprises:

receiving a series of position error signal (PES) values during a pre-selected interval based on a servo-sampling rate;

determining an absolute value for each of the PES values; and calculating an average value of the determined absolute values.

3. The method of claim 1, wherein deriving the SPES value comprises:

receiving a series of position error signal (PES) values during a pre-selected interval based on a servo-sampling rate; and calculating a root mean square (RMS) value of the PES values.

4. The method of claim 1, wherein deriving the SS value comprises:

receiving a series of the generated sensor data during a pre-selected interval based on a servo-sampling rate; and determining an absolute value for each of the sensor data; and calculating an average value of the determined absolute values.

5. The method of claim 1, wherein deriving the SS value further comprises:

receiving a series of the generated sensor data during a pre-selected interval based on a servo-sampling rate; and calculating a root mean square (RMS) value of the received sensor data.

6. The method of claim 1, wherein the sensor comprises a rotary accelerometer.

7. The method of claim 1, wherein each of the SS-threshold and the SPES-threshold values are obtained from a characterization testing of a plurality of disk drives.

8. The method of claim 1, wherein the disk drive further comprises a printed circuit board assembly (PCBA) and wherein the sensor is mounted on the (PCBA).

9. In a disk drive comprising a base, a cover, a disk being formatted with embedded servo sectors, a rotary actuator, a head affixed to the rotary actuator for reading the servo sectors, first and second sensors mounted for detecting acceleration of the disk drive, and a sampled servo control system for processing the detected acceleration and the servo sectors read by the head to control motion of the rotary actuator, a method for reducing the effects of rotational vibration in the disk drive, the method comprising:

sensing vibration by the first and second sensors and generating a corresponding first and second sensor data;

deriving a statistical sensor (SS) value based on the first and second sensor data;

deriving a statistical position error signal (SPES) value from the servo sectors read by the head;

comparing the SS value to a SS-threshold value;

comparing the SPES value to a SPES-threshold value; and generating a feed-forward command effort signal for reducing the effects of rotational vibration if the SS value exceeds the SS-threshold value and if the SPES value exceeds the SPES-threshold value.

10. The method of claim 9, wherein deriving the SPES value comprises:

receiving a series of position error signal (PES) values during a pre-selected interval based on a servo-sampling rate;

determining an absolute value for each of the PES values; and calculating an average value of the determined absolute values.

11. The method of claim 9, wherein deriving the SPES value comprises:

receiving a series of position error signal (PES) values during a pre-selected interval based on a servo-sampling rate; and calculating a root mean square (RMS) value of the PES values.

12. The method of claim 9, wherein deriving the SS value comprises:

receiving a series of the generated first and second sensor data during a pre-selected interval based on a servo-sampling rate; and generating a differential sensor value for each of the received first and second sensor data in the series.

13. The method of claim 12, wherein deriving the SS value further comprises:

determining an absolute value for each of the differential sensor values; and calculating an average value of the determined absolute values.

14. The method of claim 12, wherein deriving the SS value further comprises:

calculating a root mean square (RMS) value of the differential sensor values.

15. The method of claim 9, wherein each of the first and second sensors comprises a linear accelerometer.

16. The method of claim 9, wherein each of the SS-threshold and the SPES-threshold values are obtained from a characterization testing of a plurality of disk drives.

17. The method of claim 9, wherein each of the first and second sensors has a sensitivity axis, and wherein each sensor is oriented with its sensitivity axis at a pre-selected angle relative to an orthogonal axis of the disk drive.

18. The method of claim 17, wherein the pre-selected angle is 45 degrees.

19. The method of claim 9, wherein the disk drive further comprises a printed circuit board assembly (PCBA) and wherein the first and second sensors are mounted on the (PCBA).

* * * * *